US012607463B1

(12) United States Patent
Challoner et al.

(10) Patent No.: US 12,607,463 B1
(45) Date of Patent: Apr. 21, 2026

(54) UNIVERSAL RESONATOR CONTROLLER

(71) Applicant: Inertialwave, Inc., Torrance, CA (US)

(72) Inventors: Anthony Dorian Challoner, Manhattan Beach, CA (US); Sy-min Chueng, Torrance, CA (US)

(73) Assignee: Inertialwave, Inc., Torrance, CA (US)

( * ) Notice: Subject to any disclaimer, the term of this patent is extended or adjusted under 35 U.S.C. 154(b) by 369 days.

(21) Appl. No.: 18/207,298

(22) Filed: Jun. 8, 2023

Related U.S. Application Data

(60) Provisional application No. 63/350,034, filed on Jun. 8, 2022.

(51) Int. Cl.
  *G01C 19/5776* (2012.01)
  *G01C 19/5684* (2012.01)

(52) U.S. Cl.
  CPC ..... *G01C 19/5684* (2013.01); *G01C 19/5776* (2013.01)

(58) Field of Classification Search
  CPC ........................ G01C 19/5684; G01C 19/5776
  See application file for complete search history.

(56) References Cited

U.S. PATENT DOCUMENTS

| | | | |
|---|---|---|---|
| 4,951,508 A | 8/1990 | Loper | |
| 7,040,163 B2 * | 5/2006 | Shcheglov | G01C 19/5684 |
| | | | 73/504.13 |
| 7,437,253 B2 | 10/2008 | Shcheglov | |
| 8,061,201 B2 * | 11/2011 | Ayazi | G01C 19/5719 |
| | | | 73/504.12 |

| | | | |
|---|---|---|---|
| 9,417,067 B1 * | 8/2016 | Liu | G01C 25/005 |
| 9,958,270 B2 * | 5/2018 | Blomqvist | G01C 19/5726 |
| 10,030,976 B2 * | 7/2018 | DeWall | G01C 19/5776 |
| 10,254,116 B2 * | 4/2019 | Spahlinger | G01C 19/5635 |
| 10,274,509 B1 | 4/2019 | Challoner et al. | |
| 10,365,102 B1 | 7/2019 | Challoner | |
| 10,436,587 B2 * | 10/2019 | Sorenson | G01C 19/025 |
| 10,527,419 B1 | 1/2020 | Challoner et al. | |
| 10,670,423 B1 | 6/2020 | Challoner et al. | |
| 2005/0274183 A1 * | 12/2005 | Shcheglov | B81C 3/001 |
| | | | 73/504.12 |
| 2006/0037417 A1 * | 2/2006 | Shcheglov | G01C 19/5684 |
| | | | 702/94 |

(Continued)

OTHER PUBLICATIONS

Beitia et al. "Low Cost Cvg For High-Grade North Finders And Targeting Systems", 2014 DGON Inertial Sensors and Systems (ISS).

(Continued)

*Primary Examiner* — David J Bolduc
(74) *Attorney, Agent, or Firm* — Canady & Lortz LLP; Bradley K. Lortz

(57) ABSTRACT

A universal resonator controller device is disclosed including an analog control circuit for controlling (i.e. providing resonating or damping) of a mechanical resonator subject to inertial motion within a baseband frequency. The analog control circuit produces an analog signal varying with a varying amplitude and frequency of the mechanical resonator resulting from the inertial motion of the mechanical resonator. A digital readout circuit receives and converts the analog signal to a digital signal varying at the resonator frequency and digitally processes the digital signal to demodulate the digital signal to a digital baseband amplitude or frequency signal resulting from the inertial motion.

18 Claims, 13 Drawing Sheets

(56)      References Cited

U.S. PATENT DOCUMENTS

| | | | |
|---|---|---|---|
| 2013/0179105 A1* | 7/2013 | Liu .................... | G01C 19/5776 702/87 |
| 2013/0197858 A1* | 8/2013 | Egretzberger ..... | G01C 19/5712 702/145 |
| 2014/0000365 A1* | 1/2014 | Aaltonen .......... | G01C 19/5776 73/504.12 |
| 2015/0192415 A1* | 7/2015 | Ge .................... | G01C 19/5776 73/504.13 |
| 2016/0003618 A1* | 1/2016 | Boser .................... | G01D 5/243 73/504.12 |
| 2016/0231112 A1* | 8/2016 | Stewart ............. | G01C 19/5691 |
| 2017/0328712 A1* | 11/2017 | Collin .................. | H03M 3/458 |
| 2017/0328713 A1* | 11/2017 | Beaulaton .......... | G01C 19/5762 |
| 2018/0226938 A1* | 8/2018 | Kuisma ............. | G01R 33/0005 |
| 2019/0145773 A1* | 5/2019 | Collin ............... | G01C 19/5776 73/504.12 |
| 2021/0063158 A1* | 3/2021 | Aaltonen .......... | G01C 19/5712 |
| 2021/0108921 A1* | 4/2021 | Diazzi ................ | G01C 19/5712 |
| 2022/0373574 A1* | 11/2022 | Aaltonen .......... | G01C 19/5776 |
| 2023/0160696 A1* | 5/2023 | Avantaggiati .......... | G01C 25/00 73/1.37 |

OTHER PUBLICATIONS

IEEE Std 1431-2004 Standard Specification Format Guide and Test Procedure for Coriolis Vibratory Gyros.

Zhao et, al. "A 0.23-µg Bias Instability and 1-µg/√Hz Accel. Noise Density Silicon . . . " IEEE Journal of Solid-State Circuits, vol. 52, No. 4, Apr. 2017.

Ghahramani et al., "192MHz Differential XO Base Frequency Quadrupler . . . ",2015 IEEE Radio Frequency Integrated Circuits Symposium.

McLoskey et al., "Analysis of a Microcontroller Automatic Gain Loop" AAAC 1999.

Challoner et al., "Boeing disc resonator gyroscope" in 2014 IEEE/ION Position Location and Navigation Symposium, PLAN2014, May 5, 2014-May 8, 2014, Monterey CA, pp. 504-514.

Trusov et al., "mHRG: Miniature CVG with Beyond Navigation Grade Performance and Real Time Self-Calibration", in IEEE Inertial Sensors 2016, Laguna Beach, Feb. 23, 2016.

Lynch, "MRIG Frequency Mismatch and Quadrature Control", IEEE ISSIS 2014, Feb. 25, 2014.

Taheri-Tahrani et al., "Disk Resonator Gyroscope with Whole-Angle Operation", IEEE ISSIS 2015, Mar. 23-25, 2015.

Taheri-Tahrani et al., "A New Electronic Feedback Compensation Method for Rate Integrating Gyroscopes", IEEE ISSIS 2016, Feb. 23-25, 2016.

Challoner et al. "Universal ASIC for Low C-SWaP INS," IEEE/ION Plans, Proceedings, Apr. 20-23, 2020, Portland, Oregon.

Challoner et al. "Universal Resonator Control ASIC for Low C-Swap INS," IEEE/ION Plans, Proceedings, Apr. 24-27, 2023, Monterey, California.

* cited by examiner

UNIVERSAL RESONATOR CONTROLLER

CROSS-REFERENCE TO RELATED APPLICATIONS

This application claims the benefit under 35 U.S.C. § 119 (e) of the following U.S. provisional patent application, which is incorporated by reference herein:

U.S. Provisional Patent Application No. 63/350,034, filed Jun. 8, 2022, and entitled "Universal Resonator Controller," by Challoner et al.

STATEMENT REGARDING FEDERALLY SPONSORED RESEARCH OR DEVELOPMENT

This invention was made with Government support under Grant No. W911QX21C0035 awarded by the United States Army. The Government has certain rights in the invention.

BACKGROUND OF THE INVENTION

1. Field of the Invention

The present disclosure relates to the electronic control and readout of resonators used in a vibratory inertial sensor such as a Coriolis Vibratory Gyroscope (CVG) or a Resonator Beam Accelerometer (RBA).

2. Description of the Related Art

Inertial navigation applications require very low drift, high resolution sensor electronic control within the motion bandwidth and digital readout of inertial rate and acceleration. Because of the well-known 1/f noise characteristic of low pass analog electronics, vibratory inertial sensors resonating at a high frequency, above 1/f noise are desirable for low drift, provided digitization occurs before demodulation to baseband or the motion bandwidth and with negligible quantization noise. For vibratory inertial sensors, the relatively low bandwidth inertial motion modulates the resonator amplitude or frequency, hence the need for electronics with low noise within the modulation bandwidth centered at the resonator frequency.

Prior art analog controllers for resonators employ analog demodulation to baseband before digitization or analog phase detectors for phase lock loops to measure phase or frequency hence their outputs are subject to 1/f noise. FIG. 1A shows analog control of a Silicon Sensing CRS39-03 inductive silicon ring CVG with analog demodulation and FIG. 1B shows analog control of an Innalabs CVG SE piezoelectric metallic cylinder CVG with analog demodulation. Prior art digital controller and readout circuits for vibratory inertial sensors are complex, requiring low-latency and high resolution Nyquist ADCs, and DACs with wide bandwidth at twice resonator frequency or higher or complex Phase Lock Loops (PLLs) whose high resolution analog phase detector outputs are at baseband and hence subject to 1/f noise. FIG. 1C shows digital control of a CVG based on method of averaging, FIG. 1D shows digital control of a CVG based on velocity feedback control at baseband and FIG. 1E shows PLL control of an RBA using a PLL with a phase detector based on analog demodulation. Thus, the prior art resonator control and readout illustrated in FIGS. 1A to 1E are disadvantaged by the 1/f noise or drift with analog demodulation to baseband (FIG. 1A, 1B or 1E) or the higher power, noise, and latency of digital control at resonator (carrier) frequency (FIG. 1C or 1D).

There are multiple resonators required for inertial sensors, e.g. two resonators required for each vibratory gyro and usually two required for each vibratory accelerometer to minimize drift. There are also numerous useful types and sizes of mechanical resonators, such as ring, disc, wineglass, tuning fork, beam, plate with various transduction methods, such as capacitive, piezoelectric, and inductive and different types of unique controller and readout circuits are used for each resonator, either oscillating or damping control, or open loop sensing.

The current control and readout electronics for vibratory inertial sensors with low drift, high resolution digital readout for navigation are expensive, large, complex, high power and highly customized so not generally useful for emerging mass-produced compact MEMS sensors comprising micromechanical resonators. Furthermore, these compact MEMS sensors require compact closely coupled analog electronics to reduce size and minimize wiring parasitics that degrade noise.

In view of the foregoing, there is a need in the art for a universal resonator controller (URC) for any vibratory inertial sensor and suitable for ASIC implementation, with high resolution, digitally adaptable analog electronic control of resonator vibration velocity and linear, high resolution digital readout of resonator velocity, before demodulation, with negligible or zero quantization noise at resonator frequency and having a digital data output and synchronizing clock that enables low power centralized processing. These and other needs are met by the present invention as disclosed hereafter.

SUMMARY OF THE INVENTION

A universal resonator controller device is disclosed including an analog control circuit for controlling (i.e. providing resonating or damping) of a mechanical resonator subject to inertial motion within a baseband frequency. The analog control circuit produces an analog signal varying with a varying amplitude and frequency of the mechanical resonator resulting from the inertial motion of the mechanical resonator. A digital readout circuit receives and converts the analog signal to a digital signal varying at the resonator frequency and digitally processes the digital signal to demodulate the digital signal to a digital baseband amplitude or frequency signal resulting from the inertial motion.

A typical apparatus embodiment of the invention comprises a resonator control readout device including an analog control circuit for controlling a mechanical resonator subject to inertial motion within a baseband frequency, the analog control circuit producing an analog signal varying with a varying amplitude and a varying frequency of the mechanical resonator and resulting from the inertial motion of the mechanical resonator, and a digital readout circuit for receiving and converting the analog signal to a digital signal varying at the resonator frequency and for digitally processing the digital signal to demodulate the digital signal to a digital baseband signal resulting from the inertial motion. Controlling the mechanical resonator can comprise providing resonating or damping of the mechanical resonator.

In further embodiments, the demodulated digital baseband signal comprises an amplitude. The digital readout circuit can comprise a resonator-synchronous bandpass delta sigma modulator that is processed by a synchronous amplitude demodulator to a baseband amplitude to convert the analog signal to the digital baseband signal comprising the amplitude. The digital readout circuit can comprise a lowpass delta sigma modulator referenced to an external clock and the digital baseband signal comprising the amplitude is derived from an output of an intermediate frequency demodulator.

In further embodiments, the demodulated digital baseband signal comprises a frequency. The digital readout circuit can comprise a frequency counter referenced to on an external clock to convert the analog signal to the digital baseband signal comprising the frequency. The digital readout circuit can comprise an intermediate frequency demodulator to convert the analog signal to the digital baseband signal comprising the frequency from a derivative of a phase of an output from the intermediate frequency demodulator.

Similarly, a tyical method embodiment of the invention comprises providing control of a mechanical resonator subject to inertial motion within a baseband frequency with an analog control circuit, the analog control circuit producing an analog signal varying with a varying amplitude and a varying frequency of the mechanical resonator and resulting from the inertial motion of the mechanical resonator, and receiving and converting the analog signal to a digital signal varying at the resonator frequency and digitally processing the digital signal to demodulate the digital signal to a digital baseband signal resulting from the inertial motion with a digital readout circuit. The method embodiment of the invention can be modified consistent with any apparatus or method embodiments described herein.

BRIEF DESCRIPTION OF THE DRAWINGS

Referring now to the drawings in which like reference numbers represent corresponding parts throughout.

DETAILED DESCRIPTION

1. Overview

Figure 1A:
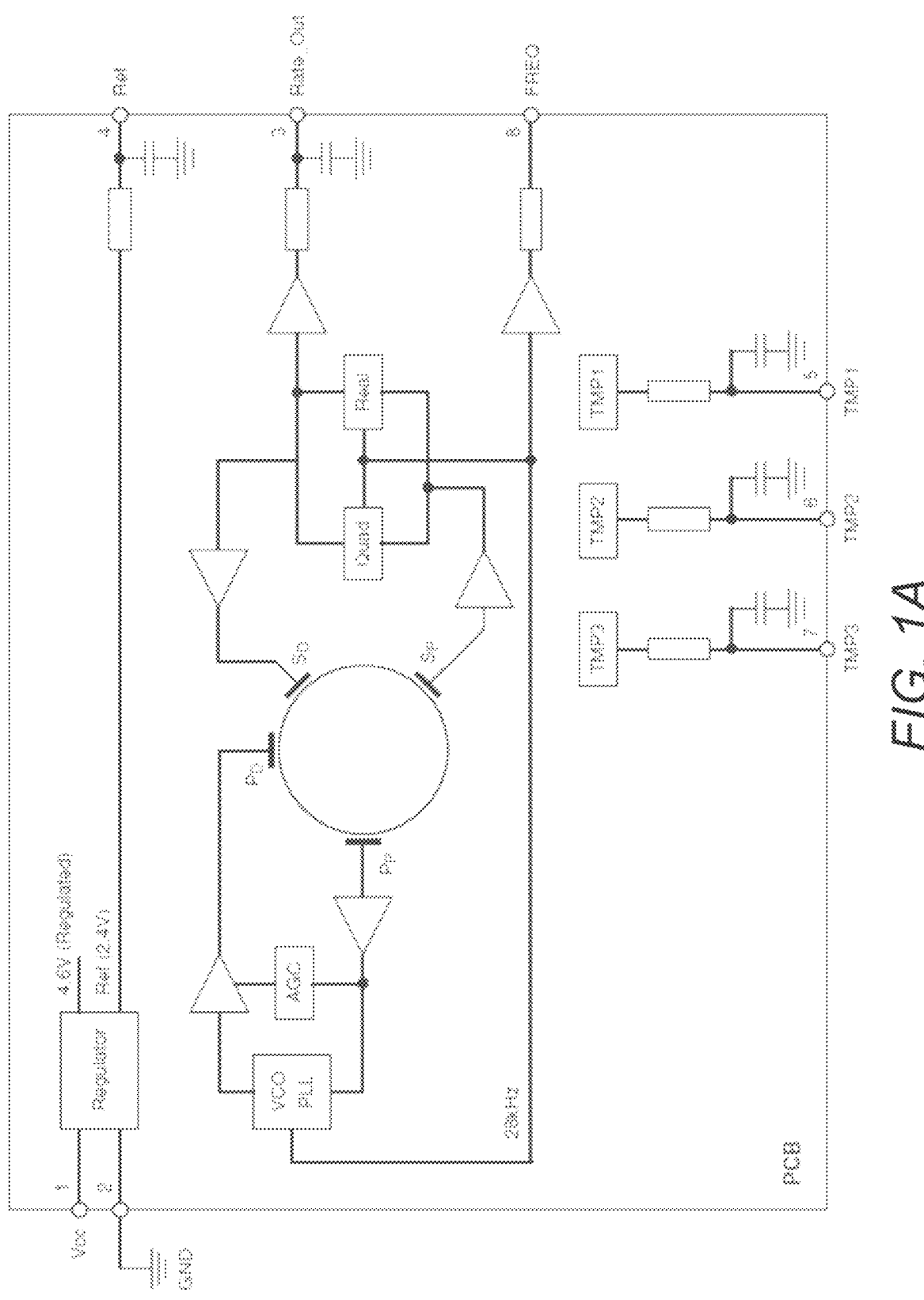
FIG. 1A shows prior art analog control of a Silicon Sensing CRS39-03 inductive silicon ring CVG with analog demodulation.
Figure 1B:
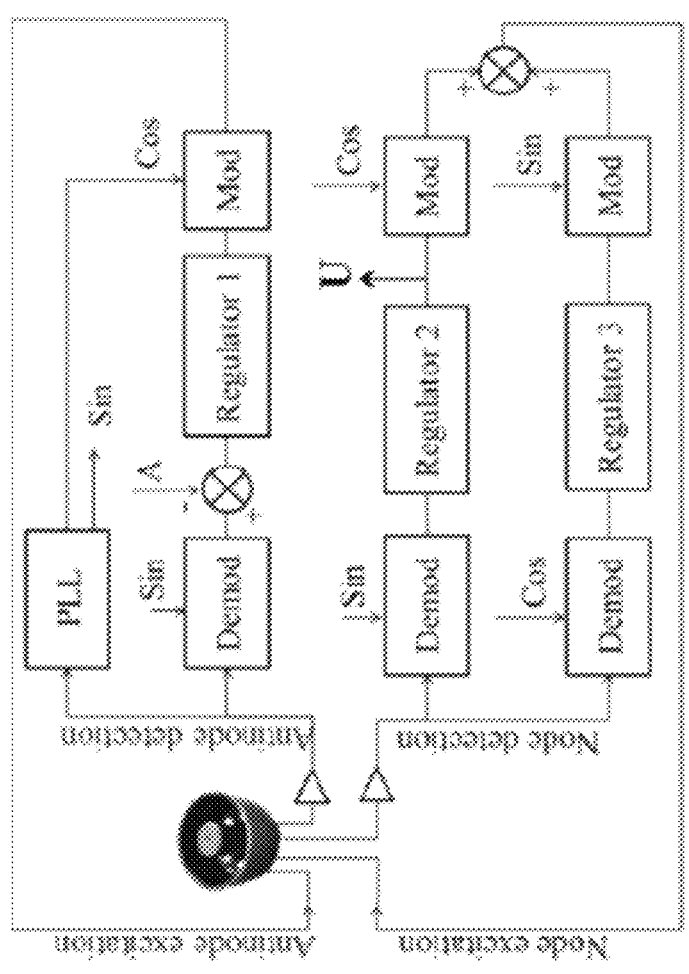
FIG. 1B shows prior art analog control of an Innalabs CVG SE piezoelectric metallic cylinder CVG with analog demodulation.
Figure 1B:
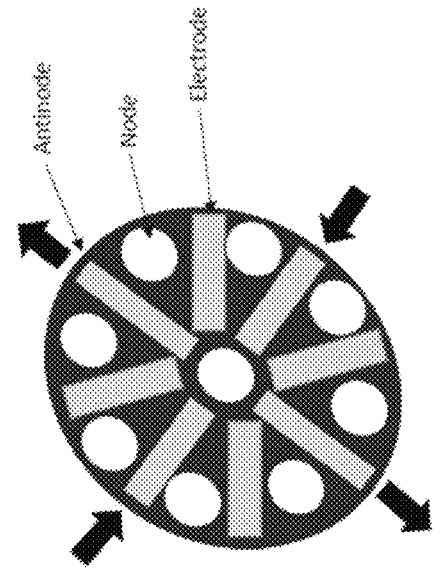
Figure 1C:
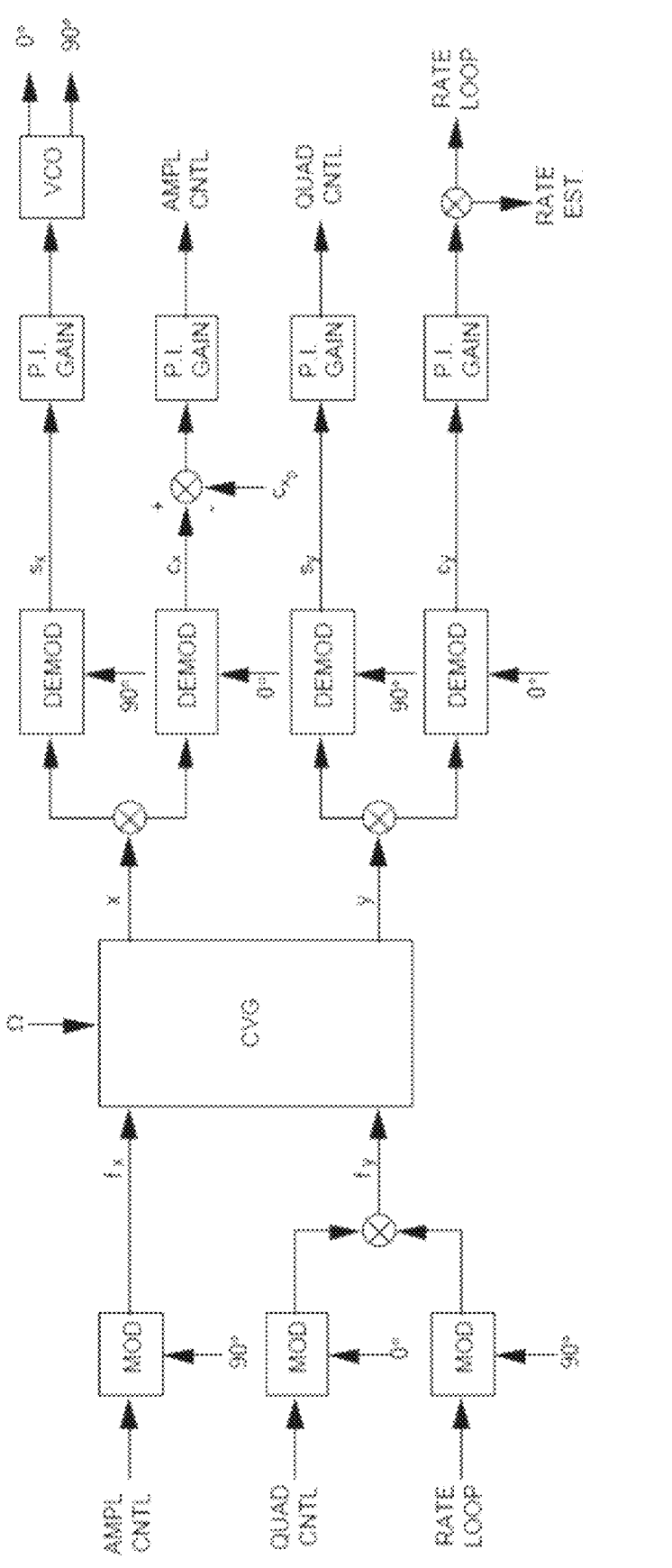
FIG. 1C shows prior art digital control of a CVG based on method of averaging.
Figure 1D:
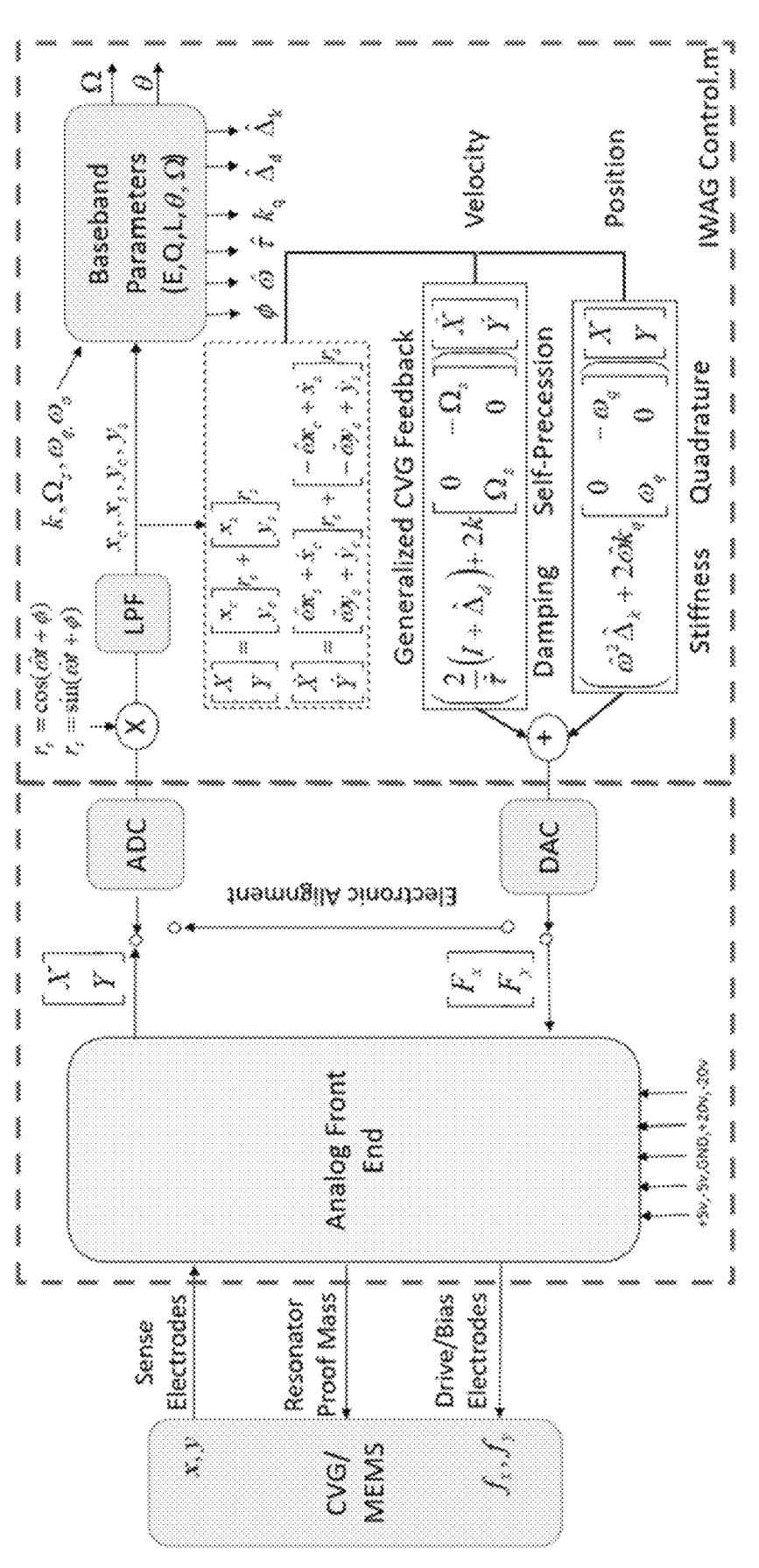
FIG. 1D shows prior art digital control of a CVG based on velocity feedback control at baseband.
Figure 1E:
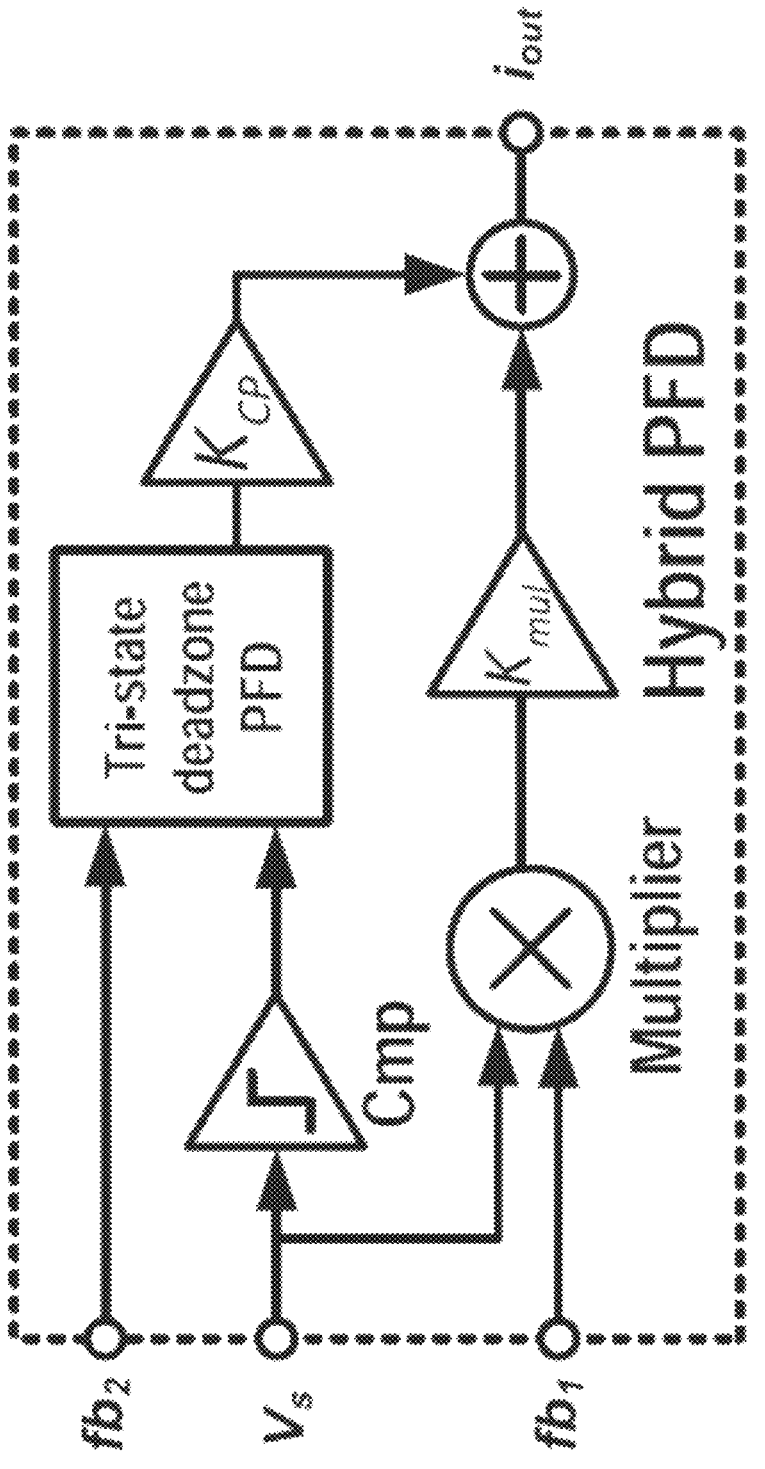
FIG. 1E shows prior art PLL control of an RBA using a PLL with a phase detector based on analog demodulation.

To maintain the inherent high resolution of analog control of high frequency resonators after digital demodulation it is desirable to have an analog control operating above 1/f noise and a digital readout circuit with negligible or zero quantization noise at resonator frequency. High frequency digital control for each resonator with over-sampling to reduce quantization noise comprises complex, low-latency, high power DSP or FPGA control electronics that must be interfaced with a central digital processor for final three-axis navigation output. To enable universal application, the fixed or slowly varying parameters of the analog controller can be digitally adapted for a specific mechanical resonator or transducer design, control bandwidth or inertial measurement range. The URC ASIC digital motion output should be sufficient to allow digital computation of resonator velocity amplitude, phase and frequency variations within the motion bandwidth and to allow synchronization of digital velocity readout with its own resonator or with a selected second reference or drive resonator. Furthermore, this URC ASIC should be compact with a layout and top metal layer that can be diced for a single, dual or multiple URC and that can be adapted for direct low parasitic interconnection to any MEMS vibratory mechanical resonator transducer within the same sensor package.

In accordance with an exemplary embodiment of the invention, a universal resonator controller (URC) with analog control and digital demodulation provides a digital readout of the parameters of the mechanical resonator velocity or force comprising a sense amplifier, velocity control and drive buffer for high resolution analog control of resonator vibration velocity and a digital readout with zero quantization noise at resonator frequency, fr comprising a bandpass 42 modulator (BPDSM) sampled at frequency fs with frequency quadrupler (fs=4*fr) or, a lowpass 42 modulator (LPDSM) sampled at frequency fs>2*fr from an external clock.

The serial digital output of the $\Delta\Sigma$ modulator with sampling clock, fs is sufficient to be demodulated and filtered to compute the estimated baseband parameters of the demodulated velocity that include in-phase velocity component, $V_i$, quadrature velocity component, $V_q$, total amplitude, $V_m$, velocity phase, $V_p$ and resonator frequency, $\hat{f}_r$.

This computation for a single resonator can be done within the URC ASIC or done efficiently in a compact, low power, ASIC optimized for digital processing or a central inertial measurement unit, IMU processor for comparison with other resonator estimated values to determine final rate and acceleration. Up to 12 URC can be required for measurement of three-axis inertial rate and acceleration. Various ASIC configurations comprising 1, 2, 4 or 12 of the same URC circuit can be diced into single ASICs for compact integration in a variety of applications and collocated with low parasitics electrical connections to MEMS resonators in a compact Multi-Chip Module (MCM).

The velocity amplitude parameters of a drive and a sense resonator for a CVG can be combined to provide an inertial rate measurement. The velocity frequency parameters of a drive resonator for a resonator beam accelerometer, RBA or two drive resonators for a dual resonator beam accelerometer (DRBA) are combined to provide an acceleration measurement. Fixed or slowly varying parameters of the URC are digitally adapted for a specific resonator type or transducer design to oscillate or damp the resonator or observe its uncontrolled open loop velocity.

A publication co-authored by the inventors, Challoner et al. "Universal Resonator Control ASIC for Low C-Swap INS," IEEE/ION Position, Location and Navigation Symposium (PLANS), Proceedings, Apr. 24-27, 2023, Monterey, California, pp 1268-1273, IBSN 978-1-6654-1772-3, which is incorporated by reference herein, describes embodiments of the present invention.

2. Resonator Control

Coriolis Vibratory Gyroscopes (CVGs) and Dual Resonant Beam Accelerometers (DRBAs) each have common control requirements. Both have two high Q mechanical vibratory modes at relatively low frequencies, mostly <100 kHz with some DRBAs <1 MHz. Both have the same need to startup and sustain a steady oscillation at a controlled amplitude. In the CVG case, only one mode, the primary mode, is sustained in steady oscillation and there is need to heavily damp the other, secondary mode, to sense Coriolis acceleration by measurement of the force required to damp and null the secondary sense mode motion.

Resonator control for vibratory inertial sensors is simpler than servos for non-vibrating beams or motors. This is because of the high Q and inherent gain stabilization afforded to a resonator by the absence of gain except at the resonator mode of interest. Collocated sensor-actuator design or bandpass filtering around the mode of interest can usually ensure this useful property. Finally, through precision micromachining or electrostatic biasing the two sensor modes can be adequately decoupled so there is a dominant 1-dof dynamic model for each mode and no need for more than simple phase and gain compensation. With transduction selection and sense electronics design to provide the open loop phase required for direct velocity feedback, then the selection of loop gain to achieve the desired bandwidth, $\omega_B$ or damping time constant, $1/\omega_B$ or de-damping time constant for self-oscillation follows from the real part of the closed loop roots of the 1-dof equation:

$$\ddot{x} + \frac{\omega}{Q}\dot{x} + \omega^2 x = -2\omega_{frb}\dot{x} = -K_F K_R K_S \dot{x} \tag{1}$$

$$\omega_B = \omega_m + \omega_{frb}, \omega_m = \frac{\omega}{2Q}, K_R = \frac{2\omega_{frb}}{K_F K_S} \tag{2}$$

$$K_R = \text{servo gain}, \frac{\text{volt}}{\text{volt}}$$

$$K_F = \text{forcing gain}, \frac{\text{m/s}^2}{\text{volt}}$$

$$K_S = \text{sensing gain}, \frac{\text{volt}}{\text{m/s}}$$

In practice, with MEMS resonators designs, $K_S$ and $K_F$ can be determined from the transducer models, the resonator modal mass and gains and the Analog Front End (AFE) gains. Alternatively, the measured open-loop transfer function peak gain, G, frequency, $\hat{\omega}$ and 3 db bandwidth, $\hat{Q}$, can yield $K_F K_S$ as $$K_F K_S = \frac{\hat{\omega}}{\hat{Q}} G \tag{3}$$

$$\Rightarrow K_R = \frac{\omega_{frb}}{\omega_m} \frac{1}{G} \tag{4}$$

Alternatively, the measured open loop gain, $G_{QL}=GK_R$, $\hat{\omega}$ and $\hat{Q}$ can yield the closed loop bandwidth:

$$\omega_B = \omega_m + \omega_{frb} = \omega_m(1 + G_{OL}) \tag{5}$$

Next, having set the required servo gain, a method to define the phase compensation required to ensure stable velocity feedback can be developed.

Figures 1F, 1G:
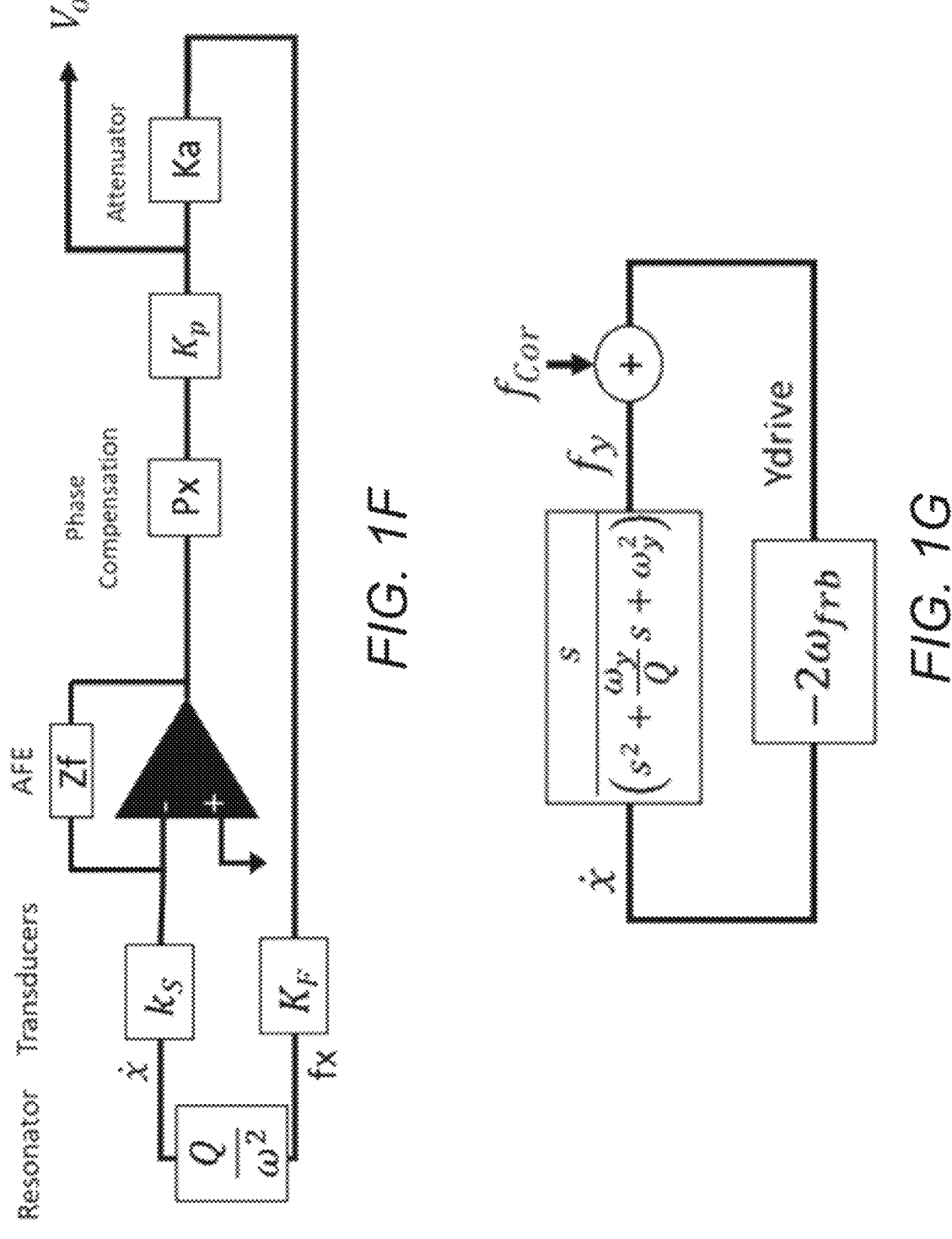
FIG. 1F shows an analog control loop model at resonance for a capacitive resonator.
FIG. 1G shows closed loop sensing of Coriolis acceleration.

FIG. 1F shows an analog control loop model at resonance for a capacitive resonator. The loop phase required is 0° for ideal de-damping or self-oscillating drive and 180° for ideal damping or force re-balance. For a capacitively transduced resonator, the analog control loop model at resonance is given in FIG. 1F. Assuming a high Q resonator and appropriate parasitic mitigation, this represents the dominant loop dynamics. With differential sense and drive the single-ended sense gain model is:

$$k_s = -2\frac{V_b C_s \gamma_s}{d_0}, \frac{\text{amp}}{\frac{\text{m}}{\text{s}}} \tag{6}$$

$$Z_F = \frac{R_f}{\left(1 + jR_f C_f \omega\right)}, \text{ohm} \tag{7}$$

$$K_s = 2R_f \frac{V_b C_s \gamma_s}{d_0}, \frac{\text{volt}}{\frac{\text{m}}{\text{s}}}, R_f C_f \omega \ll 1 \tag{8}$$

$$K_s = 2\frac{V_b C_s \gamma_s}{C_f j\omega d_0}, \frac{\text{volt}}{\frac{\text{m}}{\text{s}}}, R_f C_f \omega \gg 1 \tag{9}$$

where $C_s$ is the single-ended sense capacitance, $d_o$=the capacitive gap, $\gamma_s$ is the modal sense gain and $V_b$ is the resonator bias voltage. The single-end drive gain is:

$$\text{resonator } K_F = 2\frac{V_b C_d \gamma_d}{d_0 m_r}, \frac{\text{m/s}^2}{\text{volt}} \tag{10}$$

where $C_d$ is the single-ended drive capacitance, $m_r$ is the modal mass, $\gamma_d$ is the modal drive gain. The resonator-AFE analog phase is $<Z_f$ which is nominally 0° for trans-resistance and −90° for trans-capacitance TIA's, $R_f C_f \omega \gg 1$. Other minor ac-coupling or low-pass filtering phase can be included in $<Z_f$.

The controller compensation phase, Px at frequency, $\omega$ is either 0° or 90°, depending on $<Z_f$; the total loop phase is then 0° or 180°, set by the polarity of $K_p$. In the capacitive TIA case and all-pass filter is one solution for Px. To optimize the scaling of the output voltage, $V_o$ for subsequent analog to digital conversion a passive resistive attenuator, $K_a$ is employed. As defined above, bandwidth is set by net servo gain, $K_R=K_p K_a$ so that $$\omega_{frb} = \frac{K_F K_R K_S}{2}.$$

7

Application of active velocity feedback to CVG rate bandwidth design is clear, but self-oscillation to startup and sustain a constant vibration amplitude must be separately considered. This matter has been dealt with theoretically by M'Closkey and Vakakis in their paper on AGC design, however, it seems that desired startup time or de-damping time constant $1/\omega_B$ would be a place to begin.

$$\ddot{x}+c\dot{x}+\omega^2 x=u=K(r-z)\dot{x} \tag{15}$$

$$\dot{z}=\lambda(|\dot{x}|-z) \tag{16}$$

$$K=\left(\frac{\lambda}{2}+c\right)/r \tag{17}$$

$$r=\overline{|\dot{x}|}=\frac{2}{\pi}\omega x_0 \tag{18}$$

Evaluation of the foregoing reveals that the startup time constant is 4 times the amplitude detector filter time constant: the feedback initial gain is $$Kr\sim\frac{\lambda}{2}\sim 2\omega_B, (K_F K_S = 1)\rightarrow \lambda = 4\omega_B.$$

This provides some guidance for the filter bandwidth selection and shows it is independent of reference amplitude. As reference amplitude, r is approached the AGC gain would diminish as $\|x\|-r\|\to 0$ so overall settling time is longer than the starting time constant.

For measurement of inertial rate with a 2DOF CVG the drive axis, X is self-oscillated at the desired drive amplitude, $x_o$ with the above AGC yielding output voltage Vo=XSense and the sense axis, Y is damped with desired bandwidth, $\omega_B$ yielding output voltage Vo=YDrive. Inertial rate can then be obtained from YDrive demodulated with XSense.

For measurement of inertial acceleration with a 2DOF Dual Beam Resonator, two self-oscillating AGC control loops are used and the two output voltages are used to measure the two acceleration sensitive beam frequencies.

For analog control, XSense is in phase with drive mode velocity and resulting Coriolis acceleration $f_{cor}=k\Omega\dot{x}$, where k is the angular gain and $\Omega$ is the inertial rate. For open loop sense mode, with Ka=0, and above defined phase compensation, then sense control output Vo=YSense is in phase with Coriolis acceleration. Inertial rate, is then the direct demodulation of YSense with Xsense:

$$V_R=2(\overline{XSense \times YSense}) \tag{19}$$

$$\omega_R=K_{so}V_R \tag{20}$$

Scale factor, $K_{so}$ can be computed systematically from the sense mode dynamics model with applied Coriolis acceleration and transduction models or measured with a rate table.

For finite loop gain and bandwidth $\omega_B$, the closed loop sense response to Coriolis acceleration, at frequency $\omega_{Cor}$ can be computed, for a trans-resistance TIA as:

$$\frac{Y\,Drive}{f_{Cor}}=\frac{s}{\left(s^2+2(\omega_m+\omega_{frb})s+\omega_y^2\right)}=GL\vartheta \tag{21}$$

8

$$G=\frac{-\omega_{frb}}{\omega_m+\omega_{frb}}, \vartheta=atan\left(\frac{-(x^2+2x)\omega_y}{(2x+2)(\omega_m+\omega_{frb})}\right), \tag{22}$$

$$\omega_{Cor}=\omega_x=\omega_y(1+x)$$

FIG. 1G showing closed loop control for sensing of Coriolis acceleration.

For tuned analog closed loop sensing $\vartheta=0$, so that inertial rate is obtained from direct demodulation $$V_R=2(\overline{XSense \times YDrive}) \tag{23}$$

$$\omega_R=K_{sc}V_R \tag{24}$$

Closed loop scale factor Kac, can be computed from the dynamics, transduction and AFE models or measured with a rate table.

3. Novel Universal Resonator Controller (URC) Embodiments

Figure 2A:
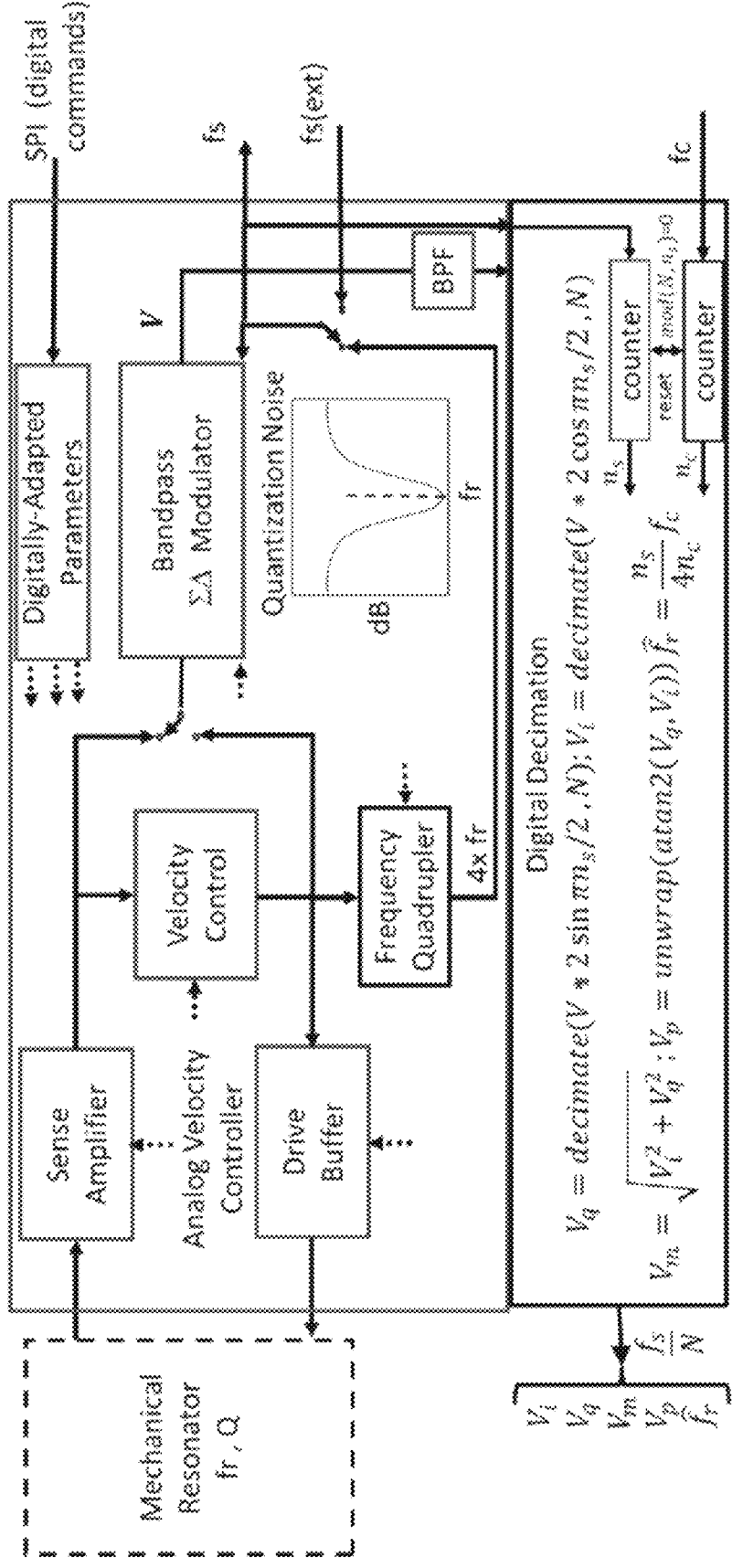
FIG. 2A shows an exemplary Universal Resonator Controller.

FIG. 2A shows an exemplary Universal Resonator Controller embodiment comprising analog control, a bandpass A2 modulator with serial digital output at frequency fs, a frequency quadrupler with synchronous clock output at frequency 4×fr, digitally selectable control parameters and digital processing to bandpass filter, demodulate and compute required resonator velocity component output parameters. The Analog Velocity Controller interfaces with a Mechanical Resonator, a Frequency Quadrupler, a Bandpass 42 Modulator (BPDSM), Digitally Adapted Parameters and Digital Demodulation processing. The high Q mechanical resonator has a mass, m vibrating at frequency fr with velocity, V and is responsive to a force, F. The Analog Controller interfaces with the Mechanical Resonator to sense the velocity via a transducer output that produces an electrical current or voltage signal received by the URC. This signal is amplified by a Sense Amplifier with digitally selectable current or voltage input. Capacitive transduction yields current output, inductive or PZT transduction yields voltage output. High impedance voltage buffers to sense voltage and output voltage or transimpedance amplifiers to sense current and output voltage are well-known in the art.

The amplified voltage at the output of the Sense Amplifier can be digitally selected, depending on the type of transduction, to be a voltage varying in phase with the velocity of the resonator. If the transducer output is in phase with resonator mass position, a 90 deg phase shift is selected for the Sense Amplifier phase at resonator frequency. This can be implemented with an analog integrator or an allpass filter with digitally selected resistor or capacitance value.

The output voltage of the Sense Amplifier is preferably in phase with resonator velocity and is received by the Velocity Controller to apply a digitally selectable gain, Kr. The device affords three basic digitally selectable gain, phase or configuration selections: (1) open loop velocity, or position measurement, (2) closed loop velocity damping requiring 180 degree open loop phase (3) closed loop velocity oscillation at fixed amplitude, requiring 0 degree open loop phase. For open loop velocity measurement Kr=0 and the Sense Amplifier output is digitized by the BPDSM.

For closed loop velocity damping the gain Kr and its polarity can be selected to provide a damping time constant or bandwidth to include the motion bandwidth. The selection of gain, Kr for damping with a desired damping rate or bandwidth is defined in Equation (4) above. The Velocity Controller output is received by the Drive Buffer and selectively applied to the resonator force transducer as a voltage or current. Capacitive and PZT transduction typically requires a voltage and inductive transduction requires a current. The Velocity Controller output is proportional to resonator velocity or force and is digitized by the BPDSM. The Drive Buffer gain and voltage limit are selected to define the maximum velocity range that can be linearly damped by the Analog Velocity Control. This sets the maximum rate measurement range for a Coriolis Vibratory Gyroscope.

For closed loop oscillation at fixed amplitude the Velocity Controller gain K and its polarity can be selected to provide a desired risetime to a sustained oscillation limited by the voltage or current limit of the Voltage Buffer. In this case the output of the Sense Amplifier can be selected for digitization by the BPDSM. The selection of gain, Kr for oscillation with the desired initial risetime before limiting occurs is defined in paragraph above. There are other methods to select gain Kr known in the art, including automatic gain control as defined in paragraphs and above and requiring additional circuitry including an amplitude detector, low pass filter, reference voltage, error amplifier and gain compensator to achieve a constant amplitude of oscillation determined by the reference voltage as will be understood by those skilled in the art. However, this amplitude is subject to 1/f noise of the analog control. In this embodiment of the invention velocity amplitude is measured after digital demodulation so is not subject to 1/f noise and is available with high resolution for precisely determining the velocity of oscillation for computation of inertial rate or for amplitude compensation of oscillation frequency or rate scale factor. The gain of the Drive Buffer is digitally selectable to define the desired nominal amplitude of oscillation.

The output of the Sense Amplifier is received by the Frequency Quadrupler to generate a synchronous digital clock waveform with frequency, 4*fr. A number of suitable techniques are known in the art such as use of frequency doublers, a phase lock loop or a dual threshold with frequency doubler and 50% duty cycle controller. The BPDSM digital conversion clock, fs, for a URC that is controlling an oscillator is connected to its own 4+fr clock, i.e. fs=4*fr. For a first URC that is damping a resonator velocity then its BPDSM conversion clock fs is connected to the 4*fr clock output of a second URC that is controlling a reference resonator as a drive oscillator. This drive oscillator at frequency fr, produces a mechanically coupled Coriolis acceleration or force at frequency fr that is re-balanced by the damping oscillator force from the first URC. The Velocity Controller output of the first URC is proportional to the force at resonator velocity and is digitized by the first URC BPDSM.

Figure 2B:
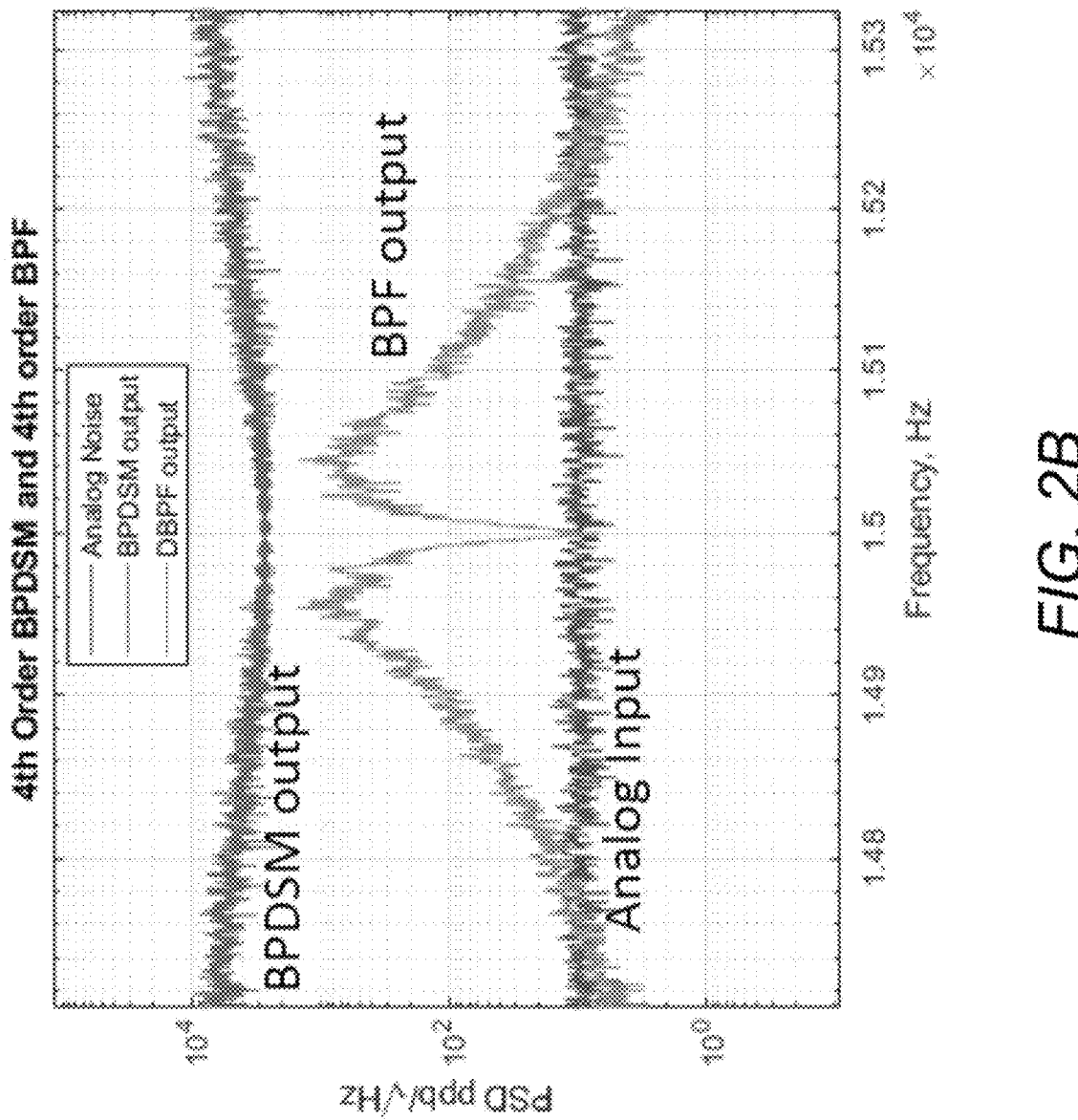
FIG. 2B show the PSD of the Analog Input noise level, the $4^{th}$ order BPDSM output and the $4^{th}$ order BPF output.

FIG. 2B show the PSD of the Analog Input noise level, the $4^{th}$ order BPDSM output and the $4^{th}$ order BPF output exhibiting digital output noise equal to the input analog noise at resonator frequency, fr. Notably for high resolution inertial sensor resonator velocity digitization, the BPDSM after bandpass filtering (BPF) of its out-of-band quantization noise yields an ideal noise transfer function with negligible or zero quantization noise contribution to the analog input at resonator frequency as shown in FIG. 2B simulation results.

Figure 2C:
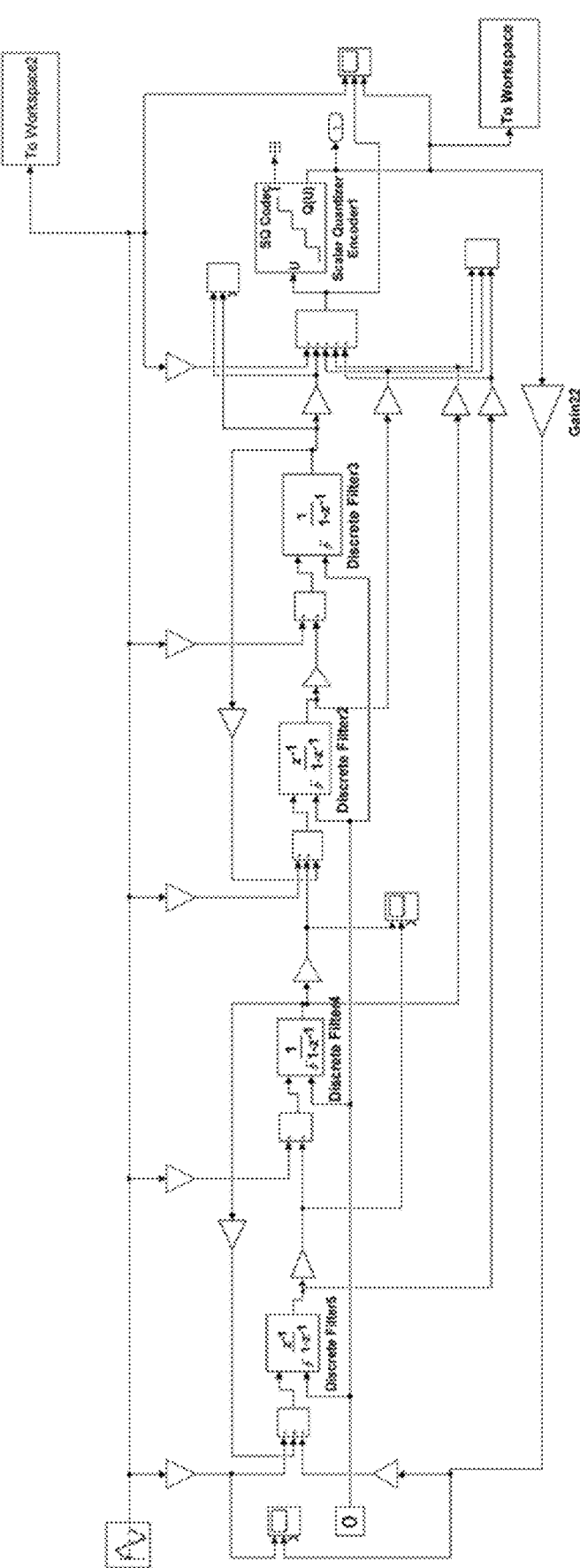
FIG. 2C shows an exemplary $4^{th}$ order BPDSM model with switched capacitor resonator circuits suitable for ASIC implementation.

FIG. 2C shows a $4^{th}$ order BPDSM model with switched capacitor resonator circuits suitable for ASIC implementation. This simulation block diagram of a fourth order Bandpass Delta Sigma Modulator (BPDSM) design is suitable for implementation in a 180 nm CMOS ASIC. The sampling frequency, fs at 4*fr for the BPDSM is generated from the analog velocity input signal from the Sense Amplifier by a frequency quadrupler.

The additional Digital Demodulation processing after the BPF of the BPDSM output V as defined in FIG. 2A comprises synchronous demodulation of the BPDSM output directly to baseband and decimation filtering to the desired output sample rate fs/N to yield the desired velocity amplitude and phase components, Vi, Vq, Vp and Vm as defined in FIG. 2A. A counter produces integer ns to define the demodulation phase pi*ns/2 that is reset after N samples of fs to achieve the desired averaging interval and output rate fs/N. The frequency of fs=4*fr in this interval is counted with a high speed clock fc to yield an estimate of the resonator frequency.

Figure 3:
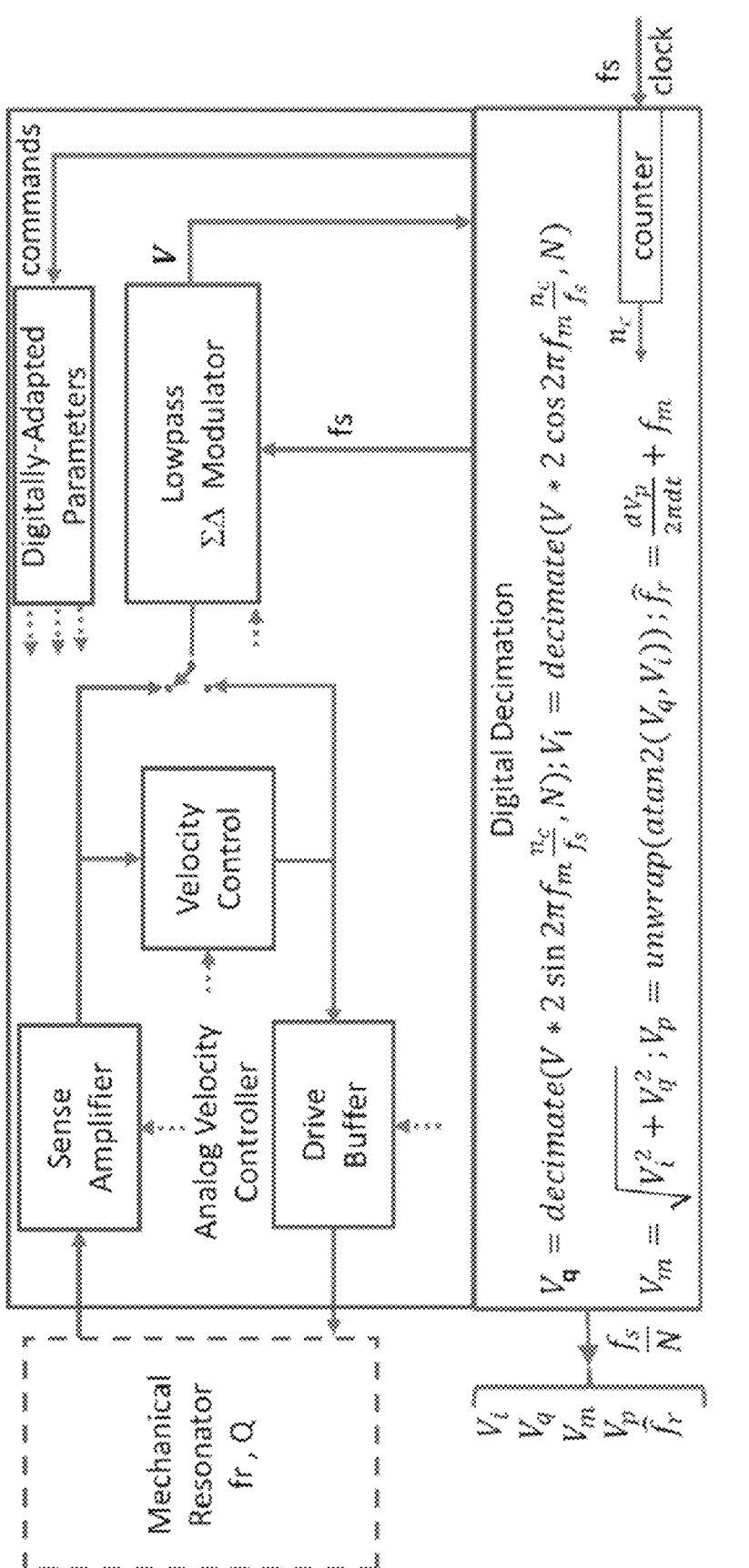
FIG. 3 shows an alternate exemplary Universal Resonator Controller embodiment.

FIG. 3 shows an alternate exemplary Universal Resonator Controller embodiment comprising analog control, a low-pass 42 modulator with serial digital output at frequency fs>2*fr, digitally selectable control parameters and digital processing to bandpass filter, demodulate and compute required resonator velocity component output parameters. The alternate embodiment of a URC comprises a Low Pass Delta Sigma Modulator (LPDSM) or a Nyquist converter. The LPDSM output after an internal bandpass filter, BPF, is sampled with a fixed sampling clock fs>2*fr to yield a digital velocity output V. As shown in the figure, the digital decimation processing demodulates V to an intermediate frequency fr-fm using demodulation phase defined by 2*pi*fm*nc/fs and decimates to an output rate fs/N, where nc is the output of a counter of the number of samples of fs. In this case resonator frequency, fr is estimated from the rate of change of intermediate frequency signal phase Vp.

Figure 4:
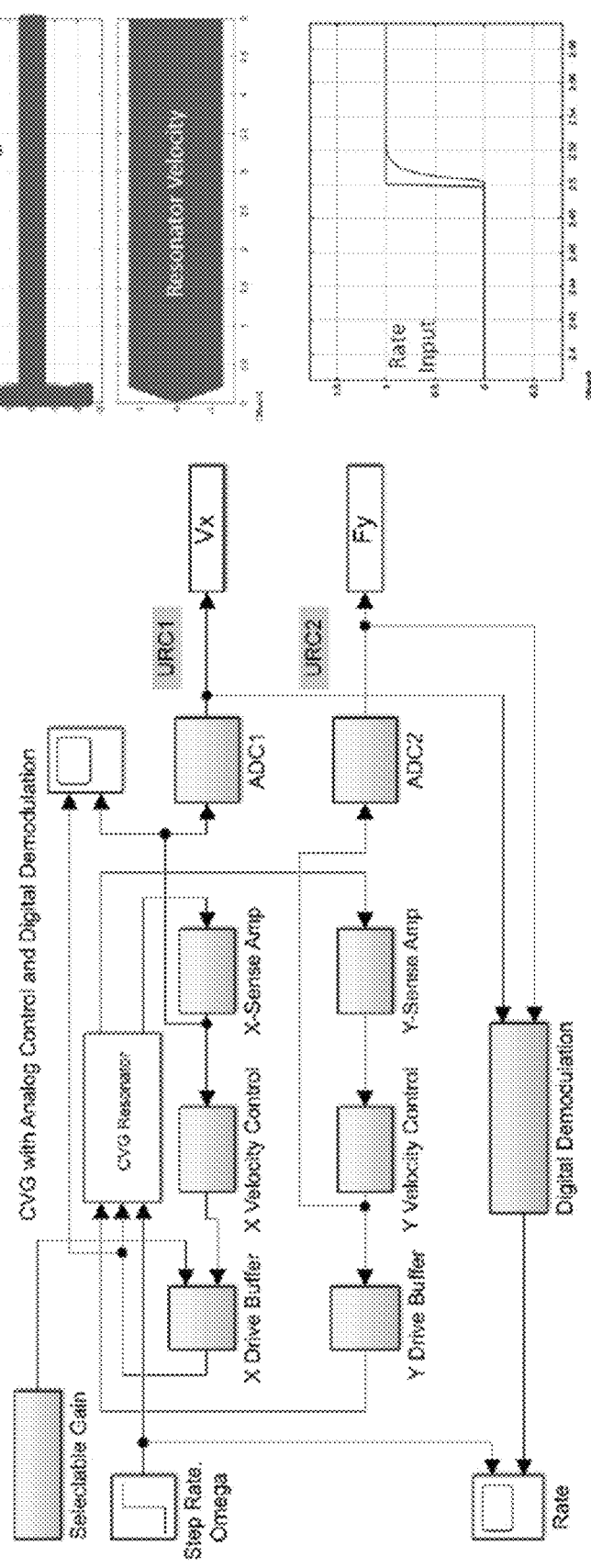
FIG. 4 shows a simulation of an CVG resonator with analog control and digital demodulation with results of digital rate processing.

FIG. 4 shows a simulation of an CVG resonator with analog control and digital demodulation with results of digital rate processing. This alternate embodiment employs two URC for the drive and sense resonators. Results show the optimal start up of the drive resonator at maximum drive amplitude followed by the digitally selectable drive attenuation to achieve the desired operational drive velocity. The Rate step response after digital demodulation is also shown for Velocity Gain selected to yield a 40 Hz bandwidth. The digital processing of the URC1 and 2 outputs at 4*fr comprises demodulation with respect to fm=fr yielding, V1i, V1q, V2i, V2q and computing V1m=sqrt (V1i^2+V1q^2) and V1p=unwrap(atan2(V1q, V1i)); V2m=sqrt(V2i^2+ V2q^2) and V2p=unwrap(atan2(V2q, V2i)); phase=V1p− V2p and rate and quadrature outputs: rate=1/2*(V1m).* (V2m).*cos(phase)/Kr and quad=1/2*(V1m).*(V2m).*sin (phase)/Kr. Kr is the rate scale factor.

Figure 5:
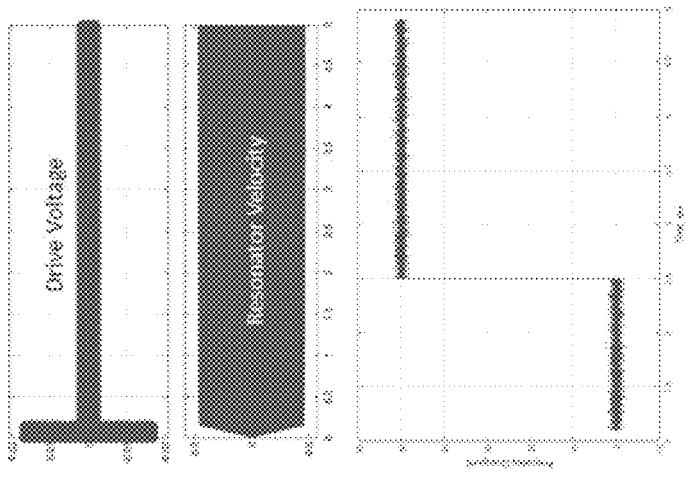
FIG. 5 shows a simulation an RBA resonator with analog control and digital demodulation with results of digital frequency processing.
Figure 5:
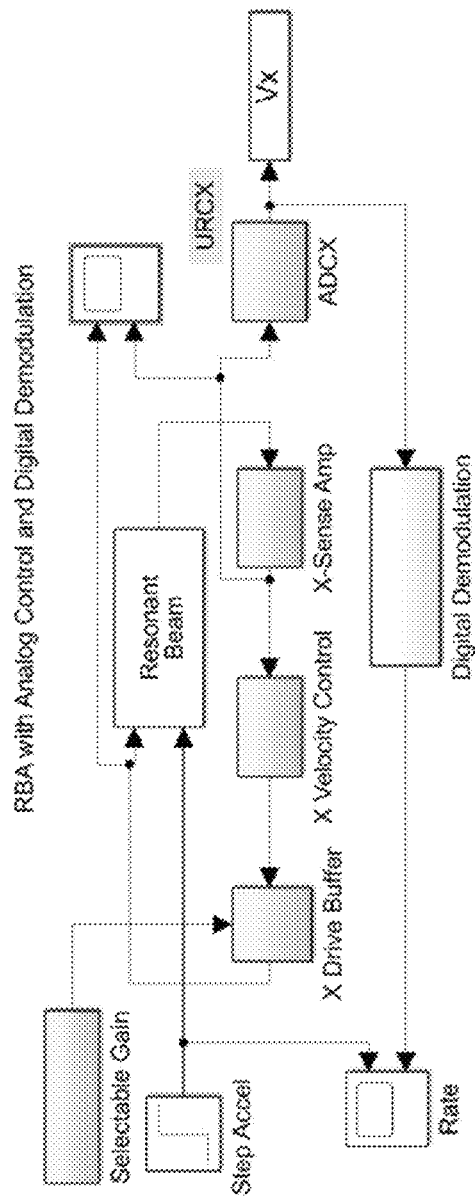
Figure 6:
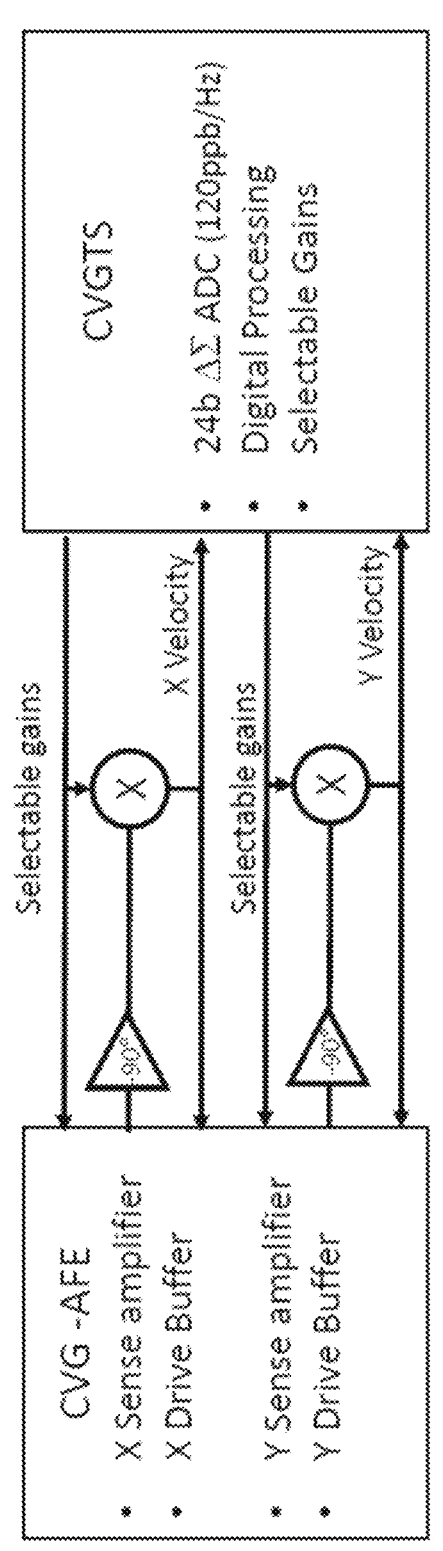
FIG. 6 shows a breadboard test setup for a CVG resonator with analog control and PC-based ADC and digital processing.

FIG. 5 shows a simulation an RBA resonator with analog control and digital demodulation with results of digital frequency processing. The simulation shows a single-beam RBA with Analog Control and Digital Demodulation using a URC. Results show the optimal start up of the drive resonator at maximum drive amplitude followed by the digitally selectable drive attenuation to achieve the desired operational drive velocity. The acceleration step response after digital demodulation is also shown with fm=fr−160 Hz. The digital demodulation processing of the ADCX output Vx yields Vxm=sqrt (Vxi^2+Vxq^2) and Vxp=unwrap(atan2 (Vxq, Vxi)); and a resonator frequency change dfx=diff (Vxp)/dt/2/pi, which is 50 Hz after the step acceleration. Accel=dfx/Ka; Ka=acceleration scale factor calibrated from test or computed from a sensor model FIG. 6 shows a breadboard test setup for a CVG resonator with analog control and PC-based ADC and digital processing. This breadboard implementation of a URC for MEMS Disc Resonator Gyroscope comprises a circuit card with the MEMS CVG and an Analog Front End comprising a TIA and IA Sense Amplifier and a Drive Buffer for the Drive resonator and the Sense resonator operating at approximately 15 kHz. The Analog Velocity Control is implement with an allpass filter to complete the Sense Amplifier output at resonator velocity phase and selectable gains for velocity feedback control to oscillate the Drive resonator at constant amplitude and damp the Sense resonator. The PC-based CVGTS comprises an LPDSM (audio codec) sampling at 192 KHz and PC Matlab decimation processing to yield inertial rate per the processing defined in FIG. 3 to yield Drive and Sense resonator velocity amplitude and phase components and the rate processing defined above. Selectable gains were commanded from the CVGTS to select gain resistor values in the breadboard AFE to define the rate range and bandwidth.

Those skilled in the art will appreciate that many other embodiments of the URC can be contemplated consistent with the principles described herein including the dynamic selection of which CVG resonator is the reference drive resonator and which is the sense resonator to implement a switched drive mode of operation or a digital divider of the resonator frequency to produce a subharmonic (fr/2) square wave drive to avoid electrical drive feedthrough at resonator frequency.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A resonator control and readout device comprising:
an analog control circuit for controlling a mechanical resonator subject to inertial motion of inertial rotation or inertial acceleration within a baseband frequency,
the analog control circuit producing an analog control signal varying with a varying amplitude at a resonator frequency of the mechanical resonator and the varying amplitude resulting from the inertial rotation of the mechanical resonator, or
the analog control circuit producing the analog control signal varying with a varying frequency of the mechanical resonator and the varying frequency resulting from the inertial acceleration of the mechanical resonator; and
a digital readout circuit for receiving and converting the analog control signal to a digital signal varying at the resonator frequency and for digitally processing the digital signal to demodulate the digital signal to a digital baseband signal resulting from the inertial motion.

2. The device of claim 1, wherein controlling the mechanical resonator comprises providing resonating of the mechanical resonator.

3. The device of claim 1, wherein controlling the mechanical resonator comprises providing damping of the mechanical resonator.

4. The device of claim 1, wherein the demodulated digital baseband signal comprises a digital amplitude.

5. The device of claim 4, wherein the digital readout circuit comprises a resonator-synchronous bandpass delta sigma modulator that is processed by a synchronous amplitude demodulator to a baseband amplitude to convert the analog control signal to the digital baseband signal comprising the digital amplitude.

6. The device of claim 4, wherein the digital readout circuit comprises a lowpass delta sigma modulator referenced to an external clock and the digital baseband signal comprising the digital amplitude is derived from an output of an intermediate frequency demodulator.

7. The device of claim 1, wherein the demodulated digital baseband signal comprises a digital frequency.

8. The device of claim 7, wherein the digital readout circuit comprises a frequency counter referenced to an external clock to convert the analog control signal to the digital baseband signal comprising the digital frequency.

9. The device of claim 7, wherein the digital readout circuit comprises an intermediate frequency demodulator to convert the analog control signal to the digital baseband signal comprising the digital frequency from a derivative of a phase of an output from the intermediate frequency demodulator.

10. A method of resonator control and readout comprising:
providing control of a mechanical resonator subject to inertial motion of inertial rotation or inertial acceleration within a baseband frequency with an analog control circuit,
the analog control circuit producing an analog control signal varying with a varying amplitude at a resonator frequency of the mechanical resonator and the varying amplitude resulting from the inertial rotation of the mechanical resonator, or
the analog control circuit producing the analog control signal varying with a varying frequency of the mechanical resonator and the varying frequency resulting from the inertial acceleration of the mechanical resonator; and
receiving and converting the analog control signal to a digital signal varying at the resonator frequency and digitally processing the digital signal to demodulate the digital signal to a digital baseband signal resulting from the inertial motion with a digital readout circuit.

11. The method of claim 10, wherein controlling the mechanical resonator comprises providing resonating of the mechanical resonator.

12. The method of claim 10, wherein controlling the mechanical resonator comprises providing damping of the mechanical resonator.

13. The method of claim 10, wherein the demodulated digital baseband signal comprises a digital amplitude.

14. The method of claim 13, wherein the digital readout circuit comprises a resonator-synchronous bandpass delta sigma modulator that is processed by a synchronous amplitude demodulator to a baseband amplitude to convert the analog control signal to the digital baseband signal comprising the digital amplitude.

15. The method of claim 13, wherein the digital readout circuit comprises a lowpass delta sigma modulator referenced to an external clock and the digital baseband signal comprising the digital amplitude is derived from an output of an intermediate frequency demodulator.

16. The method of claim 10, wherein the demodulated digital baseband signal comprises a digital frequency.

17. The method of claim 16, wherein the digital readout circuit comprises a frequency counter referenced to an external clock to convert the analog control signal to the digital baseband signal comprising the digital frequency.

18. The method of claim 16, wherein the digital readout circuit comprises an intermediate frequency demodulator to convert the control analog signal to the digital baseband signal comprising the digital frequency from a derivative of a phase of an output from the intermediate frequency demodulator.

* * * * *